C. E. MCAULEY.
TIRE ARMOR.
APPLICATION FILED DEC. 12, 1914.

1,279,385.

Patented Sept. 17, 1918.
2 SHEETS—SHEET 1.

Inventor
Columbus E. McAuley
By Edson Bro's
Attorneys

Witnesses

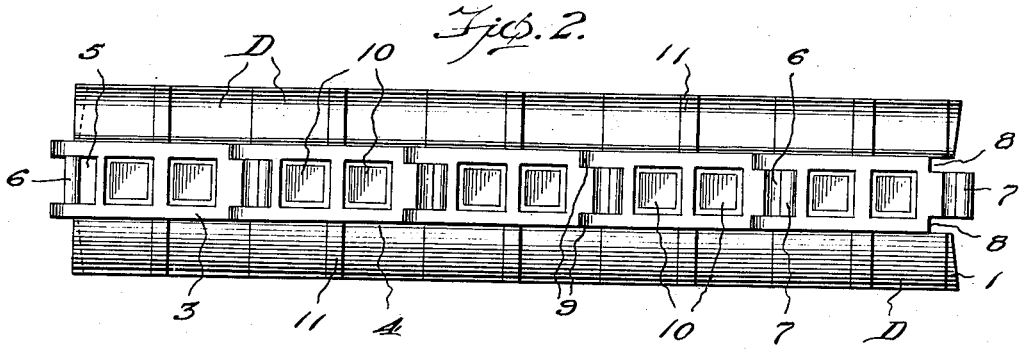
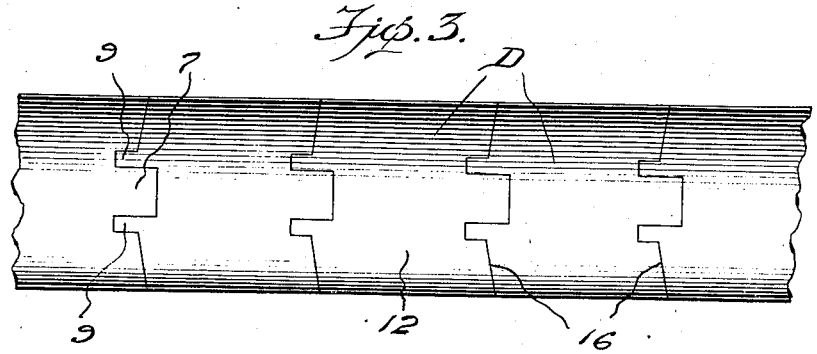
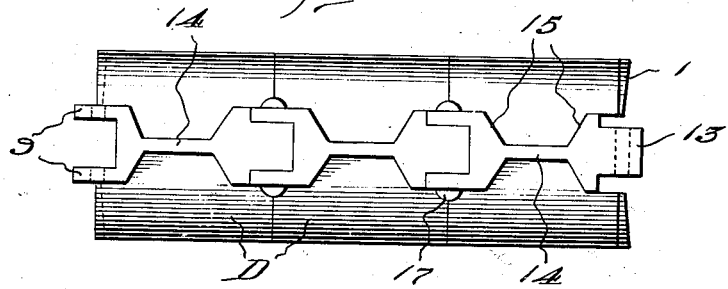
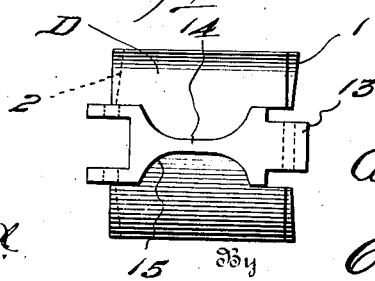

UNITED STATES PATENT OFFICE.

COLUMBUS E. MCAULEY, OF ERIN, TENNESSEE.

TIRE-ARMOR.

1,279,385.   Specification of Letters Patent.   Patented Sept. 17, 1918.

Application filed December 12, 1914. Serial No. 876,925.

*To all whom it may concern:*

Be it known that I, COLUMBUS E. MCAULEY, a citizen of the United States, residing at Erin, in the county of Houston and State of Tennessee, have invented certain new and useful Improvements in Tire-Armors; and I do hereby declare the following to be a full, clear, and exact description of the invention, such as will enable others skilled in the art to which it appertains to make and use the same.

This invention relates to tire-armor and has particular relation to armor adapted to be applied externally to a pneumatic tire, the primary object of which is to provide means whereby puncturing and skidding of the tire may be effectually eliminated.

Another object of the invention is to provide a device of the character described which shall be simple, durable, efficient in construction, easily applied to and removed from the casing of a tire of an automobile or other vehicle and which may be very quickly and cheaply repaired.

With these and other objects in view which will become apparent from the following description, this invention comprises a plurality of interchangeable links adapted, when locked together, to form a complete covering for the tread surface of a tire, and means whereby all crevices between said links are eliminated, thereby preventing tacks, glass or other foreign matter from coming into contact with the tire, said links having formed on their tread surfaces antiskidding devices and means adapted to increase the durability of the same.

In the accompanying drawings is illustrated the preferred embodiment of my invention, wherein it will be understood that various changes and modifications may be made as to the detailed construction and arrangement of parts without departing from the spirit of the invention, and in which drawings:

Fig. 2 is a top plan view of my armor showing several links interlocked.

Fig. 3 is a bottom plan view of Fig. 2.

Fig. 5 is a top plan view of a modified construction showing several links interlocked.

Fig. 6 is a view of a single link of the modified construction.

In the embodiment of the invention as disclosed in the accompanying drawings, like characters of reference are used to designate corresponding parts of the several figures, referring to which:

Figure 1:
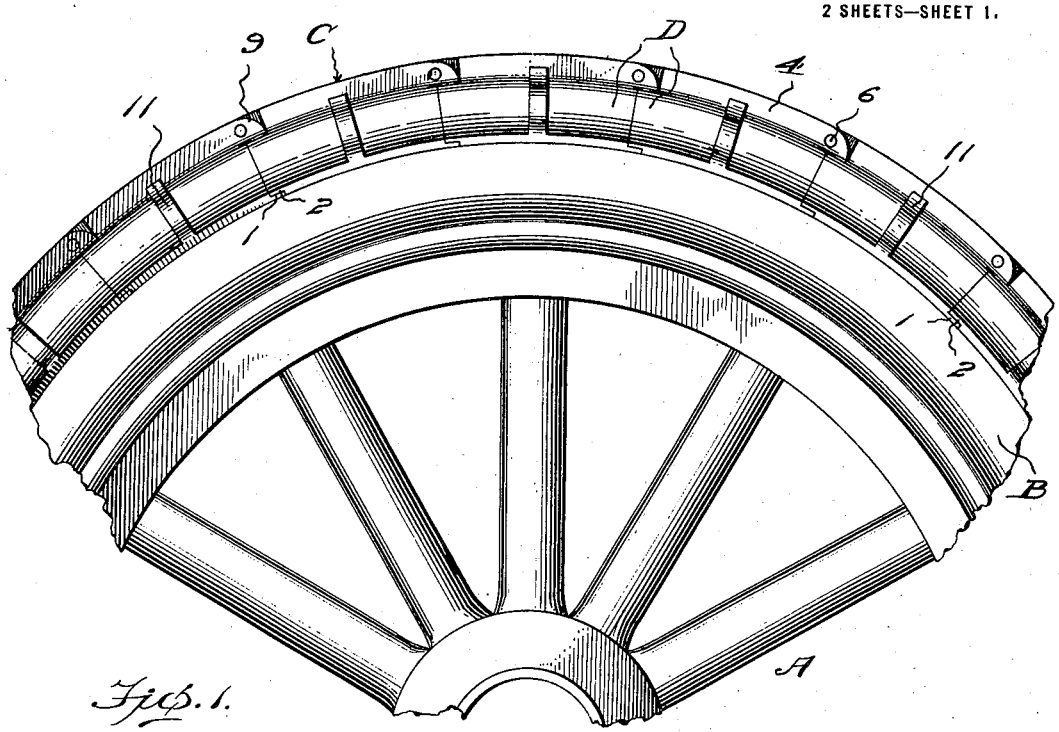
Figure 1 is a plan view of a portion of an automobile wheel showing my improved armor applied to the tire thereof.

A is a portion of a wheel and B is a tire positioned thereon and C is my improved armor as a whole, shown applied to the tread surface of said tire. The said armor is composed of a plurality of links or plates D which are preferably formed of a suitable metal, and inasmuch as said plates or links D are identical in construction, it is thought that the description of one of said plates or links will suffice to impart a correct understanding of all. Each plate or link D is formed convex in order to substantially conform to the contour of the tire to which the armor C is applied.

At one end of said plate or link D is formed a flange 1, the upper surface of which lies in a plane below that of the tread surface of the plate or link, while at the other end thereof is formed a similar flange 2 which is adapted to coöperate with flange 1 on the adjacent link or plate D, thereby preventing any foreign matter from entering the crevice formed at the junction of the two plates and lodging between the metallic armor and the tire. Each of the plates or links D is provided with a substantially rectangular shaped protuberance 3 having side walls 4, said side walls being substantially parallel to that of the outer edges of said plates or links D. At one end of the rectangular protuberance 3 is provided a bifurcation 5 formed by the side walls 4 of the rectangular protuberance 3. Positioned within the bifurcation 5 is a bolt or other suitable member 6, the function of which will be hereinafter set forth. At the other end of said rectangular protuberance 3 is a substantially hook-shaped portion 7 which projects beyond the end of the plate or link D. The side walls 4 of the rectangular protuberance 3 do not extend out flush with the end of the plate or link D at the end upon which the hook-shaped portion 7 is mounted, thus forming recesses 8 between the hook-shaped portion 7 and the body portion of the plate or link D. At the other end of the rectangular protuberance 3, however, the side walls 4 extend beyond the edge of the plate or link D as shown at 9. It will thus be seen that when a plurality of the plates or links are connected together, the projections 9 will seat within the recesses 8, thereby affording a firm connection between the plates or links and also rendering the appearance of the rectangular protuberances 3 as being continuous when a plurality of the links or plates D are connnected together. Intermediate of the side walls 4 of the rectangular protuberance 3 are positioned a plurality of recesses 10.

The plates or links D are also provided with semi-crescent-shaped flanges 11, which are positioned intermediate the edges of said plates or links D. It will be noted from this construction that the flanges 11 not only act as anti-skidding devices, but also act as braces for the device as a whole and especially for the rectangular protuberance 3. The plates or links D are preferably cast in one piece of metal, thus making the manufacture of the same economical and also affording means whereby the plates or links D composing the armor C, may be easily replaced in case the same are broken or become damaged in any way.

In assembling the plates or links D the hook-shaped portion 7 of one plate or link D is brought into engagement with the bolt or other suitable member 6 of the adjacent link or plate D, at which time the projections 9 also engage the recesses 8 and the flanges 1 engage the flanges 2. This operation is continued until the armor is of sufficient size to encompass the tire desired to be protected.

In Fig. 3 is shown the face 12 of the armor which is adapted to engage the surface of the tire, and in this figure it may be clearly seen the manner in which the hook-shaped portion 7 engages the bifurcation 5, and also the manner in which the projections 9 engage the recesses 8 forming an irregular joint 16 and through which it is practically impossible for any foreign matter to pass.

Figure 4:
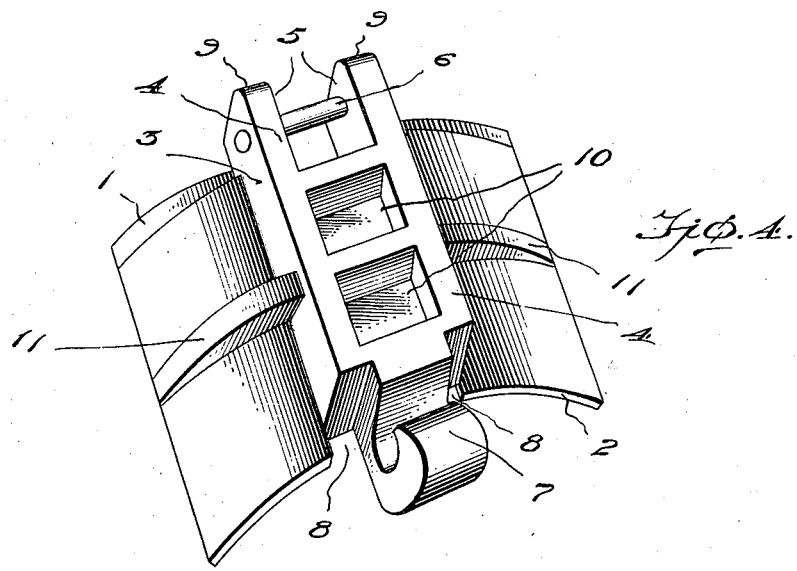
Fig. 4 is a perspective view of a single link.

A modification of this invention as disclosed in Figs. 5 and 6 is substantially similar to the construction as disclosed in the plates comprising the armor heretofore described, with the exception that instead of using the hoop-shaped portion 7, an apertured projection 13 is used to engage the bifurcation 5, the two being connected together by means of a suitable bolt or other member 17 as shown in Fig. 5. The tread surface of the device disclosed in Figs. 5 and 6, it will also be noted, is different from that disclosed in Fig. 4. In Figs. 5 and 6 the tread surface consists of a protuberance 14 extending lengthwise of the plate or link D, said protuberance 14 being restricted near its central portion and flared outwardly at its ends as shown at 15. In this connection it might be stated that the armor as disclosed in Figs. 5 and 6 is particularly adapted for use in connection with the front wheels of an automobile, whereas the armor disclosed in Fig. 1 is particularly adapted for use in connection with the rear wheels of an automobile. It will be noted from Fig. 1 that when the different plates or links D are assembled, they form an endless chain, which chain may be applied to a tire when the same is deflated by laterally moving the armor with relation to the wheel, in position on the tire. The tire is then inflated to the extent desired, at which time the armor C assumes its proper position around the outer surface thereof. It is a well known fact that automobile tires have different circumferential measurements and owing to this fact it may be found necessary in the practical use of this invention, to manufacture some of the plates or links D of different sizes in order that the armor C may be made to fit a tire of unusual dimensions.

It is obvious from the foregoing that in case the armor should become damaged during its use, the same could be quickly repaired by merely deflating the tire and removing the damaged plate or plates D and replacing the same with new ones which might be carried in some convenient place on the automobile.

As heretofore stated, there is positioned on the plates or links D intermediate of the side walls 4 of the rectangular protuberance 3, a plurality of depressions 10. The primary object of these depressions 10 is to afford means whereby the skidding or slipping of the tires is prevented, but it will be also noted that such depressions 10 greatly reduce the weight of each link or plate D, thereby forming an armor which is of comparative lightness. The plates or links D may be made of any suitable dimensions, and it has been found in actual use of the device that the armor when completed and applied to a tire, possesses great flexibility which is greatly desirable in devices of this character.

It is obvious that this invention is not limited to the precise construction shown in the drawings, and that various modifications and alterations may be made therein by one skilled in the art, within the scope of the appended claims.

I claim:

1. A link for a tire protector formed of a single sheet of material curved to conform to the tread of a tire and having a protuberance on the tread surface of the link, said protuberance being formed of a plurality of parallel ribs positioned longitudinally of the link, which ribs extend beyond one end of the sheet of material to provide an overhanging portion, and with a plurality of spanning members, the overhanging portions of the parallel ribs being connected by a spanning member at one end of the link, while the other end of the ribs are closed by a spanning member having a hooked-shaped element formed integral with the parallel ribs and of a width substantially equal to that of the space between said ribs whereby said hooked-shaped element may be fitted between the parallel overhanging rib members of another link to engage a spanning member between said rib members.

2. An armor for tires of the type described comprising a plurality of inter-connected links arranged to encompass the tire, each link having a tire tread-conforming base which is provided with a substantially rectangular protuberance formed by elongated side walls and integral spanning members, said base having approximately edgewise arranged semi-crescent shaped ribs or flanges of less height than the side wall of the protuberance, the thickest of said flanges abutting against said side walls, said ribbed flanges extending at substantially right angles from the side walls and vanishing at the outer edges of the base.

3. A tread for tires comprising a plurality of interconnected links, each link being provided with a tread-conforming base member and a plurality of upstanding parallel walls projecting at substantially right angles to said tread-conforming base, spanning ribs connecting the walls at predetermined intervals to leave a space between them to facilitate traction of the tire tread, said walls being positioned in arrears of one end of said tread-conforming base member and terminating in advance of the other end thereof, and means coöperating with said parallel walls to detachably lock the plurality of links to encompass a tire with the upstanding walls forming a substantially unbroken tread surface around the tire.

In testimony whereof, I affix my signature in presence of two witnesses.

COLUMBUS E. MCAULEY.

Witnesses:
J. C. HOBBS,
ROBERT BOONE.